(12) United States Patent
Dilalan et al.

(10) Patent No.: US 9,618,038 B2
(45) Date of Patent: Apr. 11, 2017

(54) DEVICE COMPRISING A BEARING AND A JOURNAL MOUNTED IN THE BEARING

(71) Applicant: CONTINENTAL AUTOMOTIVE GMBH, Hannover (DE)

(72) Inventors: Uemit Dilalan, Mannheim (DE); Bruno Ferling, Beindersheim (DE); Alexander Jaegle, Mannheim (DE)

(73) Assignee: Continental Automotive GmbH, Hannover (DE)

( * ) Notice: Subject to any disclaimer, the term of this patent is extended or adjusted under 35 U.S.C. 154(b) by 12 days.

(21) Appl. No.: 14/766,500

(22) PCT Filed: Jan. 14, 2014

(86) PCT No.: PCT/EP2014/050623
§ 371 (c)(1),
(2) Date: Aug. 7, 2015

(87) PCT Pub. No.: WO2014/124772
PCT Pub. Date: Aug. 21, 2014

(65) Prior Publication Data
US 2016/0010687 A1    Jan. 14, 2016

(30) Foreign Application Priority Data
Feb. 13, 2013  (DE) .................. 10 2013 202 342

(51) Int. Cl.
*F16C 33/08*     (2006.01)
*F16C 11/02*     (2006.01)
(Continued)

(52) U.S. Cl.
CPC .............. *F16C 33/08* (2013.01); *F16B 19/05* (2013.01); *F16C 11/02* (2013.01); *F16C 25/02* (2013.01); *F16C 43/02* (2013.01)

(58) Field of Classification Search
CPC ........... F16C 33/08; F16C 43/02; F16B 19/05
(Continued)

(56) References Cited

U.S. PATENT DOCUMENTS 6,220,417 B1 * 4/2001 Linsbauer ............... F16D 1/072
                                                          192/105 BA
6,342,739 B1    1/2002 Furuya et al.
(Continued)

FOREIGN PATENT DOCUMENTS

CN        101465572 A    6/2009
CN        101542090 A    9/2009
(Continued)

Primary Examiner — Thomas R. Hannon
(74) Attorney, Agent, or Firm — Laurence A. Greenberg; Werner H. Stemer; Ralph E. Locher

(57) ABSTRACT

A method adjusts axial play of a journal mounted in a bearing. A bearing axis defines a z-direction. A positive z-direction points from first to second bearing ends. The journal inserted into the bearing in the positive z-direction is moved to a first form-locking engagement in the positive z-direction between journal and bearing. A spacer at the second end defines axial play. A bushing is placed onto a journal segment protruding from the bearing at the second end in the positive z-direction. A form-locking and/or force-locking connection is established between bushing and journal by deforming the bushing and locating the spacer along the z-direction between bushing and second end. The spacer contacts the bushing and second end. The spacer is removed. A device having a bearing and a journal mounted and relatively movable therein within axial play is also provided.

6 Claims, 5 Drawing Sheets

(51) Int. Cl.
*F16B 19/05* (2006.01)
*F16C 25/02* (2006.01)
*F16C 43/02* (2006.01)

(58) Field of Classification Search
USPC .......................................................... 384/903
See application file for complete search history.

(56) References Cited

U.S. PATENT DOCUMENTS

| | | | |
|---|---|---|---|
| 6,799,894 B2 * | 10/2004 | Fidziukiewicz | ........ F16C 17/02 |
| | | | 384/296 |
| 6,842,939 B1 * | 1/2005 | Hasegawa | ............. B60S 1/0488 |
| | | | 15/250.3 |
| 8,156,604 B2 * | 4/2012 | Kraus | ................... B60S 1/0488 |
| | | | 15/250.3 |
| 8,205,448 B2 | 6/2012 | Koch et al. | |
| 2007/0158396 A1 | 7/2007 | Lauk et al. | |
| 2012/0055154 A1 | 3/2012 | Ebert | |

FOREIGN PATENT DOCUMENTS

| | | |
|---|---|---|
| DE | 19537503 A1 | 3/1997 |
| DE | 102004009717 A1 | 9/2005 |
| DE | 102006021185 A1 | 11/2007 |
| DE | 102010043147 A1 | 10/2011 |
| DE | 112010002024 T5 | 8/2012 |
| EP | 1041303 A1 | 10/2000 |
| EP | 2072846 A2 | 6/2009 |
| WO | 2008071254 A1 | 6/2008 |

\* cited by examiner

DEVICE COMPRISING A BEARING AND A JOURNAL MOUNTED IN THE BEARING

BACKGROUND OF THE INVENTION

Field of the Invention

The present invention relates to a method for setting an axial play of a journal mounted in a bearing and to a device comprising a bearing and to a journal mounted in the bearing.

Movements of various components or machine elements relative to one another must be guided and controlled in very many different areas of industry. Typical examples are the linear motion of a piston mounted in a cylinder or the rotary motion of a journal mounted in a rotary bearing or that of a shaft mounted in a rotary bearing. However, the accuracy with which components or machine elements can be manufactured in respect of their geometrical dimensions is only finite. Moreover, these dimensions are often subject to variations during operation owing to thermal fluctuations or owing to mechanical stress.

In order to take account of such fluctuations and variations, the geometrical dimensions of the guiding elements and/or of the elements to be guided are therefore typically chosen in such a way that said elements can be moved to a limited extent relative to one another even in relation to those degrees of freedom of the movement which are supposed to be constrained by the guide. For example, the geometrical dimensions of a rotary bearing and of a journal rotatably mounted in the rotary bearing are usually chosen in such a way that the journal can also be moved to a limited extent along the axis of rotation. A maximum distance by which the journal mounted in the bearing can be moved relative to the rotary bearing along the axis of rotation is also referred to as axial play.

It is often advantageous or even necessary to be able to set such play with a predetermined accuracy. Hitherto, this has been accomplished by producing the geometrical dimensions of the corresponding components or elements with the desired accuracy. Thus, document DE 10 2006 021 185 A1 describes a closure flap for an exhaust turbocharger in which the mounting and centering of a closure cap relative to an actuating arm is improved. For this purpose, the closure cap has a raised region, which engages in a complementary groove in the actuating arm. However, increased requirements on the desired accuracy are typically associated with increasing costs of manufacture.

BRIEF SUMMARY OF THE INVENTION

It is thus the underlying object of the invention to develop a method for setting an axial play of a journal mounted in a bearing which, on the one hand, ensures as accurate as possible setting of the axial play and, on the other hand, can be carried out in the simplest and least expensive way possible. Moreover, the intention is to propose a device having a bearing and a journal mounted in the bearing, in which an axial play of the journal is as precise as possible and which can be produced as inexpensively as possible.

This object is achieved by a method and by a device in accordance with the independent claims. Specific embodiments are described in the dependent claims.

Thus, the proposal is for a method for setting an axial play of a journal mounted in a bearing along a bearing axis of the bearing, wherein the bearing axis defines a z direction, and the positive z direction points from a first bearing end of the bearing to a second bearing end of the bearing. The method comprises the following steps:

inserting the journal into the bearing;
  moving the journal relative to the bearing in the positive z direction up to form-locking engagement in the positive z direction between the journal and the bearing;
  arranging a spacer that defines the axial play to be set on the second bearing end;
  placing a bushing onto a segment of the journal that protrudes from the bearing at the second bearing end in the positive z direction;
  establishing a form-locking and/or force-locking connection between the bushing and the journal by at least partial deformation of the bushing in such a way that the spacer is arranged between the bushing connected to the journal and the second bearing end in the z direction and is in contact with the bushing and the second bearing end; and
  removing the spacer.

Here, it should be emphasized that the method steps mentioned can also be carried out in a different order from that stated above.

The method proposed here differs from known methods primarily in that setting of the axial play takes place only during assembly. Any inaccuracies which may be present in the dimensions of the bearing or the journal can be compensated for in a particularly simple and effective manner by means of the proposed form-locking and/or force-locking connection of the bushing to the journal. In this case, the axial play to be set is defined by a thickness of the spacer in the z direction. This can be set with great accuracy in a simple and inexpensive manner. For example, it is possible in this way to set the axial play with an accuracy of less than 0.2 mm or less than 0.1 mm without difficulty.

Typically, the journal has a cylindrical or substantially cylindrical shape. The bearing is normally integrated into the component and usually has a shape complementary to the shape of the journal. Thus, the bearing also generally has a cylindrical or substantially cylindrical shape, in which case the bearing axis is then defined by a cylinder axis. In lateral directions perpendicular to the z axis, there is then form-locking engagement between the bearing and the journal.

The form-locking engagement in the positive z direction between the journal and the bearing constrains the movement of the journal relative to the bearing in the positive z direction. It can be achieved by means of corresponding protrusions or projections on the journal and, if appropriate, by means of recesses in the bearing which are complementary to said protrusions or projections, these typically projecting from the journal perpendicularly to the z direction. It can also be achieved by the journal having a cross section perpendicularly to the z direction, in a segment projecting from the bearing in the negative z direction at the first bearing end, which is larger than a corresponding cross section of the bearing. The form-locking engagement in the positive z direction can likewise be achieved by means of an element which is connected form-lockingly and/or force-lockingly and/or materially to the journal.

The bushing can be designed at least in some region or regions as a ring or as a hollow cylinder, the shape of which is complementary at least in some region or regions to the segment of the journal which projects from the bearing at the second bearing end. Thus, the bushing can be pushed onto said segment of the journal in the negative z direction. The bushing is generally formed completely or at least partially from metal. Through the connection of the bushing to the journal, form-locking engagement between the bushing and the journal in the positive and in the negative z direction is preferably brought about. Of course, it is also conceivable to produce material engagement between the bushing and the journal, e.g. through the action of heat.

Before the spacer is removed, the spacer is typically in contact with the second bearing end in the negative z direction and with the bushing in the positive z direction, with the result that the spacing between the bushing and the second bearing end along the z axis is defined precisely by the thickness of the spacer. At least in the region in which it is arranged on the second bearing end during assembly and is brought into contact with the bushing and with the second bearing end, the spacer preferably has a uniform thickness. After the removal of the spacer, the journal can normally be moved in the negative z direction until there is form-locking engagement between the bushing connected to the journal and the second bearing end.

In a specific embodiment of the method, at least one protrusion is formed in the bushing by the deformation of the bushing, said protrusion engaging in each case in a recess in a surface of the journal, said recess being complementary to the protrusion. In this way, the form-locking engagement and/or the force-locking engagement between the bushing and the journal can be established in a particularly simple manner. Here, a force for the deformation of the bushing typically acts on the bushing perpendicularly to the z axis. Thus, the bushing is normally deformed in at least one lateral direction perpendicular to the z axis. The protrusion on the bushing and the complementary recess in the journal are preferably arranged or formed on mutually facing surfaces of the bushing and of the journal. These surfaces are typically each aligned parallel to the z axis. The recess can be designed as an annular groove extending in a plane perpendicular to the z axis on or in the surface of the journal. The protrusion can then simultaneously be designed as an annular protrusion pointing radially inward toward the journal from the bushing, for example. However, it is also possible for different recesses, which are not interconnected, to be provided in or on the surface of the journal. During the deformation of the bushing, a further force in the negative z direction can simultaneously be exerted on the bushing. This ensures that the bushing rests on the spacer and is in contact therewith after the production of the connection between the bushing and the journal.

In another embodiment, the bushing is deformed at a distance from the axial ends of the bushing, along the z axis, i.e. in an "interior" of the bushing and not at its ends. Thus, the method is not sensitive to the depth of the recess in the surface of the journal. There is always sufficient material available to engage completely in the recess and to ensure a stable connection between the bushing and the journal. The distance from the axial ends of the bushing can be in each case at least ten percent or at least 20 percent of a length of the bushing along the z axis, for example. For example, the distance can be greater than 2 mm, greater than 5 mm or greater than 1 cm, depending on the length of the bushing.

In another embodiment, the bushing is deformed in each case by less than three times, preferably in each case by less than twice, a wall thickness of the bushing in a deformation direction. The bushing can likewise be deformed in each case by at least 0.5 times, preferably in each case by at least 1 times, the wall thickness of the bushing in the deformation direction. Here, the deformation direction is the direction in which the force for deforming the bushing acts on the bushing. Normally, this is perpendicular to the z axis. A deformation within the limits mentioned is suitable for establishing a sufficiently stable connection between the bushing and the journal and can generally be achieved while applying relatively low forces which can be applied by means of an appropriate tool, even manually for example. In the region of the deformation, a wall thickness of the bushing is typically less than 5 mm, less than 3 mm or less than 1 mm. A depth of the recess in the surface of the journal can be at least 2 percent, at least 5 percent or at least 10 percent of a radius of the journal in a plane perpendicular to the z axis. For example, the depth is at least 0.5 mm, at least 1 mm or at least 2 mm.

In another embodiment, the deformation of the bushing is performed by means of a crimping tool or by means of a rolling tool. This can be accomplished either manually or by machine. The crimping tool can be crimping tongs, for example.

There is furthermore a proposal for a device comprising:
a bearing having a bearing axis, which defines a z direction, wherein the positive z direction points from a first bearing end to a second bearing end,
a journal, which is mounted in the bearing and is freely movable relative to the bearing along the z axis within an axial play, and
a bushing, which at least partially surrounds a segment of the journal that protrudes from the bearing at the second bearing end and is connected form-lockingly and/or force-lockingly to the journal,
wherein
the connection between the bushing and the journal is achieved by means of at least one deformation of the bushing, wherein the deformation engages in a recess in a surface of the journal, said recess being complementary to the deformation, and
the axial play of the journal relative to the bearing in the negative z direction is limited by form-locking engagement in the negative z direction between the bushing and the second bearing end.

This is therefore preferably a device which can be produced by means of the method described above, that is to say in a particularly simple and low-cost manner. In the case of this device, the axial play can be defined with particularly high accuracy.

In a specific embodiment, the axial play of the journal relative to the bearing is less than 2 mm or less than 1 mm. For example, the axial play can be less than 2 percent or less than 1 percent of an axial length of the journal or of an axial length of the bearing. It is thereby possible to take account of deformations due to thermal fluctuations during the operation of the device, for example.

The bearing is preferably a rotary bearing, in which the journal is mounted in the bearing in such a way as to be rotatable relative to the bearing axis. The bearing can be designed as a plain bearing or as a rolling bearing.

In the simplest case, the bearing is a bore or through hole in a component for receiving the journal. The component in which the bearing is arranged or the bearing itself at the first and/or at the second end is preferably of flat design. In this case, the first and/or the second bearing end is preferably aligned perpendicularly to the z direction.

In another embodiment, the recess in the surface of the journal is spaced apart in the z direction from that end of the journal which projects from the bearing at the second bearing end. Thus, in particular, the recess does not extend as far as the journal end mentioned, as is the case with a screw thread for example, in which the thread extends as far as the end of the screw. This results in form-locking engagement and/or force-locking engagement between the bushing and the journal, both in the positive and in the negative z direction.

In another embodiment, the journal is connected to a flap or is of one-piece design with the flap, wherein the flap is designed to open and close a bypass valve in order to control a boost pressure in a turbocharger for an internal combustion engine. In this case, the opening and closing of the bypass valve is brought about by a rotary motion of the journal in the bearing, for example. In this illustrative embodiment, the precise setting of the axial play is particularly advantageous since the journal and the flap can easily be excited into severe vibration if the axial play set is too great. As a result, high noise pollution and severe mechanical wear can occur.

BRIEF DESCRIPTION OF THE SEVERAL VIEWS OF THE DRAWING

Illustrative embodiments of the invention are shown in the drawings and are explained in greater detail by means of the following description. In the drawings.

DESCRIPTION OF THE INVENTION

Figure 1:
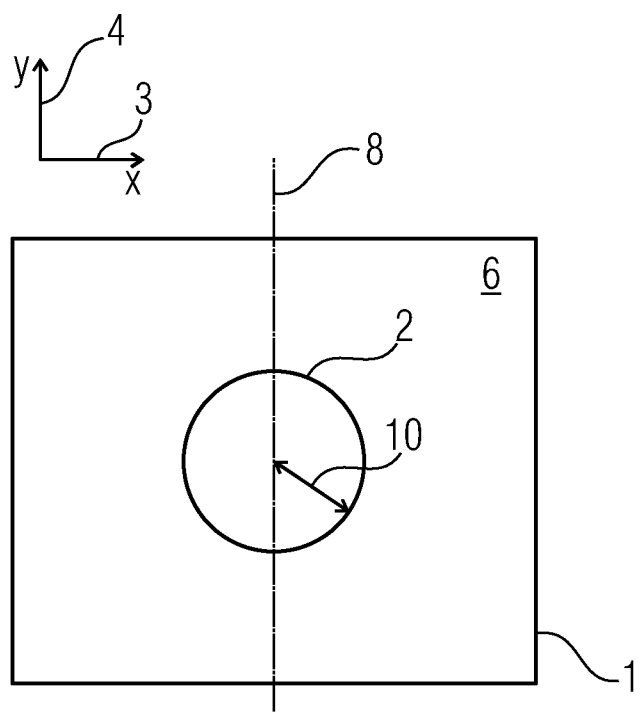
FIG. 1 shows a plan view of a component having a bearing of circular cross section.
Figure 2:
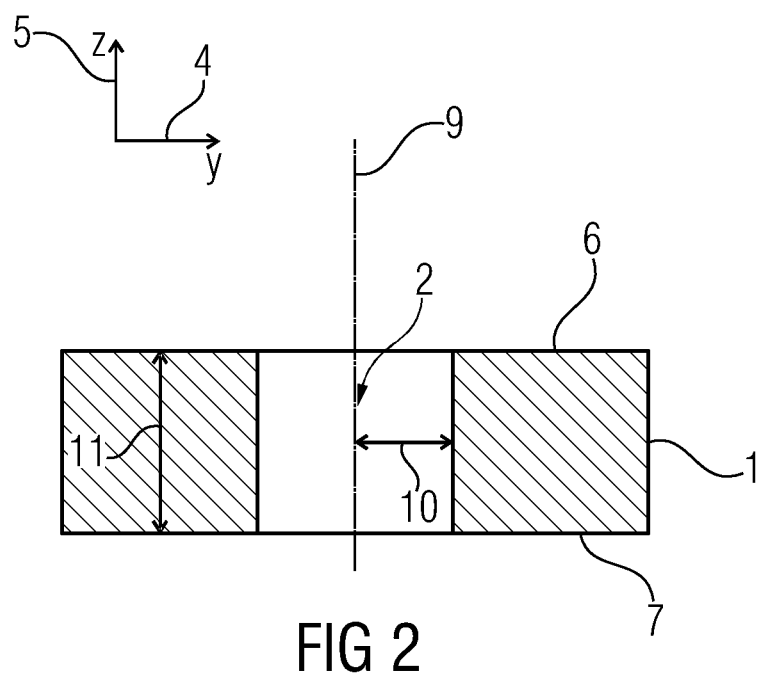
FIG. 2 shows a section through the component from FIG. 1 along a line of section shown in FIG. 1.

FIG. 1 shows a component 1 with a bearing 2 of circular cross section arranged in the component, in a plan view. A flat upper side 6 of the component 1, which is visible in the plan view shown here, is aligned in an x-y plane, wherein the x-y plane is defined by a positive x direction 3 and a positive y direction 4. FIG. 2 shows the component 1 from FIG. 1 in a section along a line of section 8 shown in FIG. 1. The direction of view in FIG. 2 is in the negative x direction, i.e. from right to left in FIG. 1. Here and in the text which follows, repeated features are each provided with the same reference signs. The bearing 2 is designed as a bore or through hole in the component 1, which extends in a positive z direction 5, straight from an underside 7 of the component 1 to the upper side 6 of the component 1. The z direction is parallel to a bearing axis 9, which is a cylinder axis of the cylindrical bearing 2. In the illustrative embodiment shown here, a radius 10 of the bearing 2 defined perpendicularly to the bearing axis 9 is 0.5 cm. A thickness 11 of the component 1 defined in the z direction 5, which simultaneously defines a length of the bearing 2 in the z direction, is 1 cm here, for example. The component 1 is of plate-type design and is manufactured from metal, e.g. from iron or steel.

Figure 3:
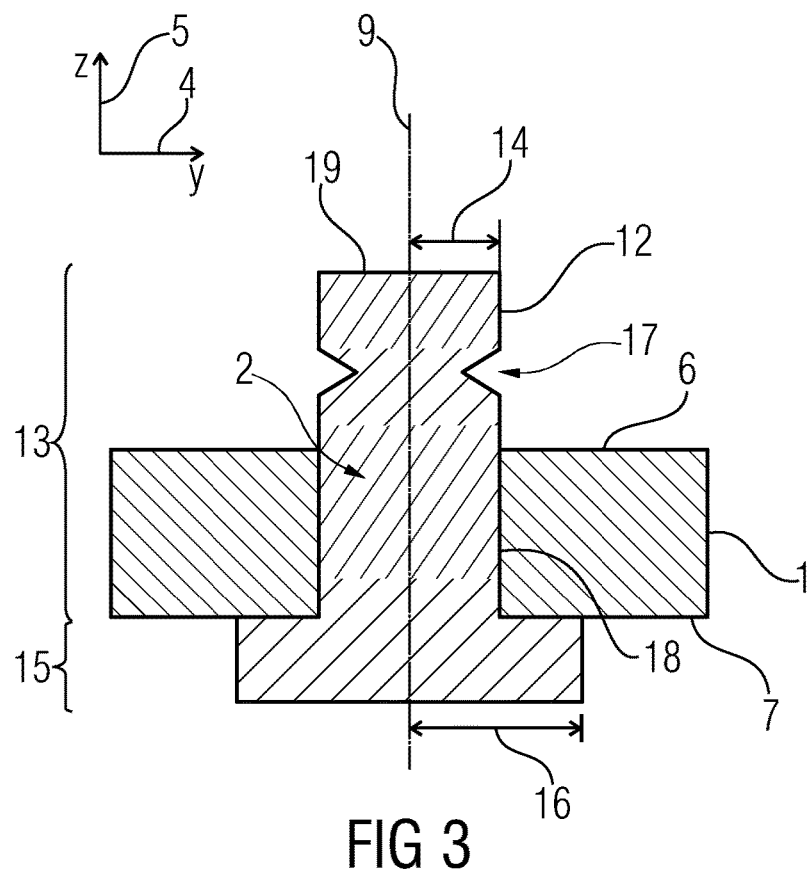
FIG. 3 shows a component from FIG. 2 with a journal inserted into the bearing.

FIG. 3 shows the component 1 after a journal 12 has been inserted into the bearing 2 in the positive z direction 5, more specifically as far as form-locking engagement in the positive z direction between the journal 12 and the bearing 2 or between the journal 12 and the underside 7 of the component 1, said underside forming a first bearing end of the bearing 2. The journal is likewise made from metal. The insertion of the journal 12 into the bearing 2 and the movement of the journal 12 in the positive z direction 5 until there is form-locking engagement in the positive z direction 5 are steps of the method described above for setting an axial play of the journal 12 mounted in the bearing 2. In a first axial segment 13 of the journal 12, the journal 12 has substantially a cylindrical shape complementary to the bearing 2, wherein a radius 14 of the journal 12 in segment 13 is slightly smaller than the radius 10 of the bearing 2, with the result that the journal has a minimal radial play parallel to the x-y plane in the position shown in FIG. 3, in which it has been inserted into the bearing 2, although this play is not shown explicitly here. The journal 12 is thus arranged in the bearing 2 in such a way as to be rotatable relative to the bearing axis 9. In a second axial segment 15 of the journal 12, which adjoins the first segment 14, the journal 12 has a radius 16 which is greater than the radius 14 in the first segment and greater than the radius 10 of the bearing 2. The form-locking engagement in the positive z direction 5 between the journal 12 and the bearing 2 or the component 1 is provided by this cross section of the journal 12 in the second segment 15, said cross section being enlarged as compared with a x-y cross section of the bearing 2. In FIG. 3, the second segment 15 of the journal 12 rests on the flat underside 7 of the component 1 and is in contact therewith. At the second bearing end of the bearing 2, said end being formed by the upper side 6 of the component 1, the journal projects from the bearing 2, in this case by about 1 cm, for example. A recess 17 in the form of an annular groove, which is arranged in or introduced into a surface 18 of the journal 12 aligned parallel to the z direction, is likewise shown in FIG. 3. The recess 17 encircles the journal 12 perpendicularly to the cylinder axis of the journal 12, which here coincides with the bearing axis 9. Here, a constant depth of the recess 17 in the surface 18 is 1 mm, for example. Along the cylinder axis of the journal 12 or along the z direction 5, the recess 17 is spaced apart from the upper end 19 of the journal 12, e.g. by about 4 mm, with the result that the recess 17 does not extend as far as the upper end 19 of the journal 12.

Figure 4:
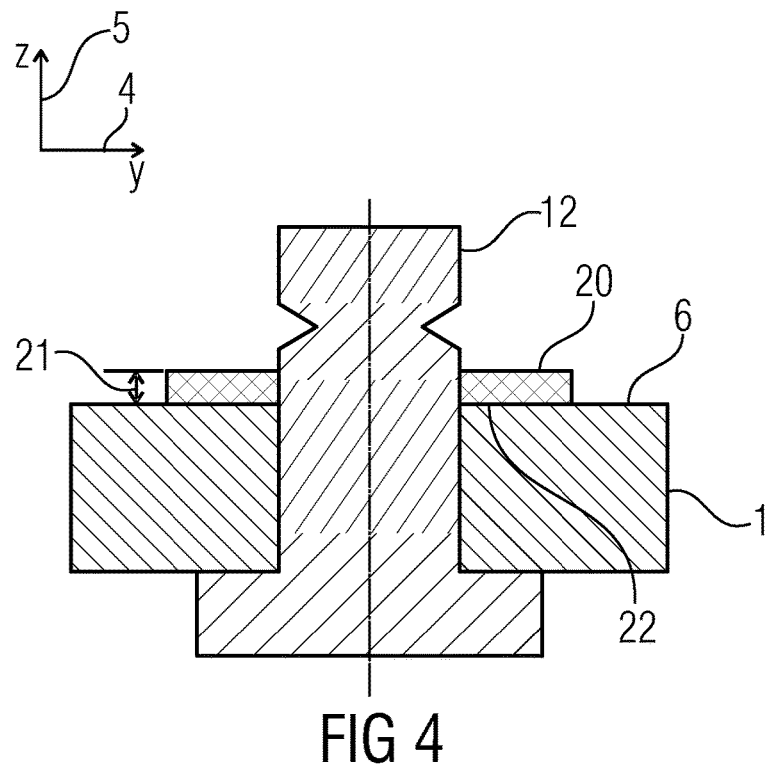
FIG. 4 shows the component with the journal inserted into the bearing, wherein a spacer is arranged on a second bearing end.

FIG. 4 shows the component 1 and the journal 12, once again in the arrangement shown in FIG. 3, after a spacer 20 with a constant thickness 21 of 1 mm has been arranged on the upper side 6 of the component 1 and hence at the second bearing end of the bearing 2 in a further step of the method described here. The thickness 21 of the spacer 20, which is likewise metallic, defines the axial play, to be set, of the journal 12 in the bearing 2. The spacer 20 at least partially surrounds the journal 12 in the x-y plane and extends as far as the journal 12 in the x-y plane. An underside 22 of the spacer 20 rests in a region, which forms the second bearing end, of the upper side 6 of the component 1 and is in contact with said region.

Figure 5:
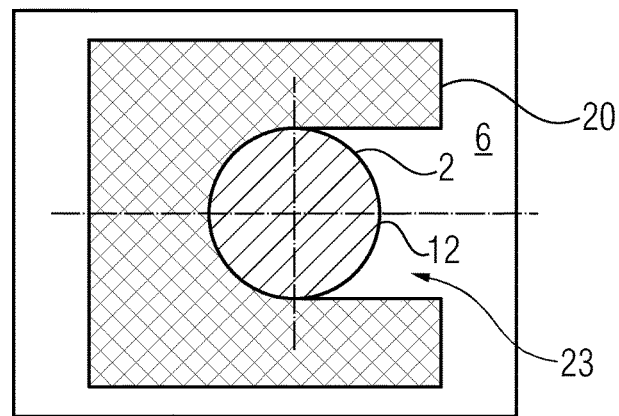
FIG. 5 shows a plan view of the component, the journal and the spacer from FIG. 4.

FIG. 5 shows a plan view of the arrangement shown in FIG. 4, wherein the direction of view is the negative z direction, as in FIG. 1.

The upper side 6 of the component 1 with the journal 12 inserted into the bearing 2 is illustrated. Likewise shown is the approximately fork-shaped spacer 20, which has a recess 23, which is at least partially complementary to the circular cross section of the journal 12, is open toward the right-hand side here and into which the journal 12 is partially received, with the result that the spacer extends over at least half of the circumference of the journal 12 toward the latter and encloses it.

Figure 6:
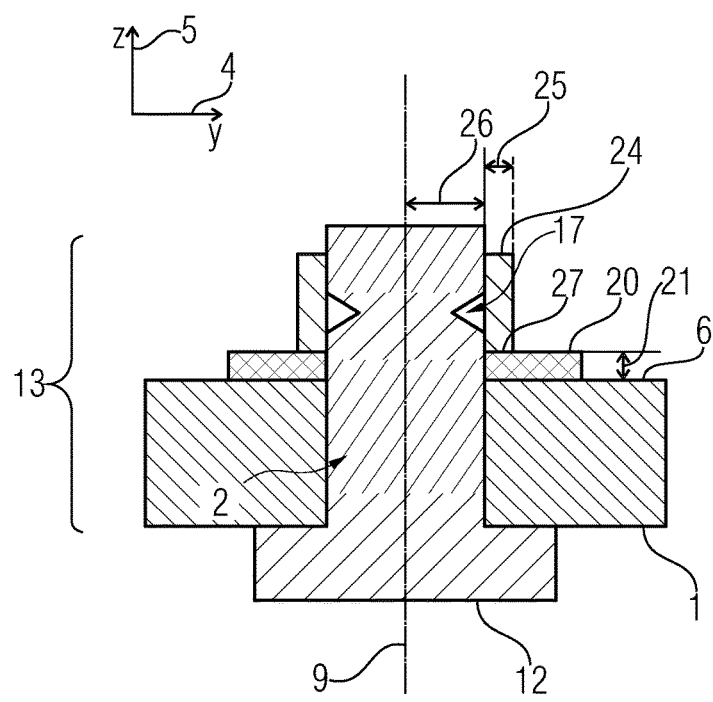
FIG. 6 shows the component, the journal and the spacer from FIG. 4, wherein a bushing is placed on a segment of the journal projecting from the bearing at the second bearing end.

FIG. 6 once again shows the arrangement already illustrated in FIG. 4 after a metal bushing 24 with the shape of a hollow cylinder has been placed on the segment of the journal 12 which projects from the bearing 2 in the positive z direction 5 in a further method step. In FIG. 6, the bushing 24 has a constant wall thickness 25 of 1 mm (but it can have different diameters in the crimping region and the remaining, in-contact region in an alternative variant). Like the radius 10 of the bearing 2, an internal radius 26 of the bushing 24 is 0.5 cm and therefore has a shape complementary to the first axial segment 13 of the journal 12 and can be pushed onto said segment. In the z direction 5, the bushing 24 thus surrounds at least some region or regions of that segment of the journal 12 which projects from the bearing 2 at the second bearing end. In the arrangement in FIG. 6, the spacer 20 is arranged between the bushing 24 and the upper side 6 of the component 1 in the z direction 5. The spacer 20 thus rests on the upper side 6 of the component 1 and is in contact therewith in the negative z direction. In the positive z direction, the spacer 20 is in contact with an underside 27 of the bushing 24. The underside 27 of the bushing 24 is of completely flat design, with the result that the bushing 24 rests on and makes contact with the spacer 20 over its entire underside 27. In the z direction, the spacing between the underside 27 of the bushing 24 and the upper side 6 of the component 1 is therefore defined precisely by the constant thickness 21 of the spacer 20.

FIG. 7 once again shows the arrangement from FIG. 6 in the plan view already known from FIGS. 1 and 5, with a direction of view in the negative z direction. The wall thickness 25 and internal radius 26 of the bushing 24, which completely surrounds the journal 12 radially and which here partially conceals the spacer 20 since the latter is arranged between the bushing 24 and the upper side 6 of the component 1 in the z direction, are clearly visible.

Figure 7:
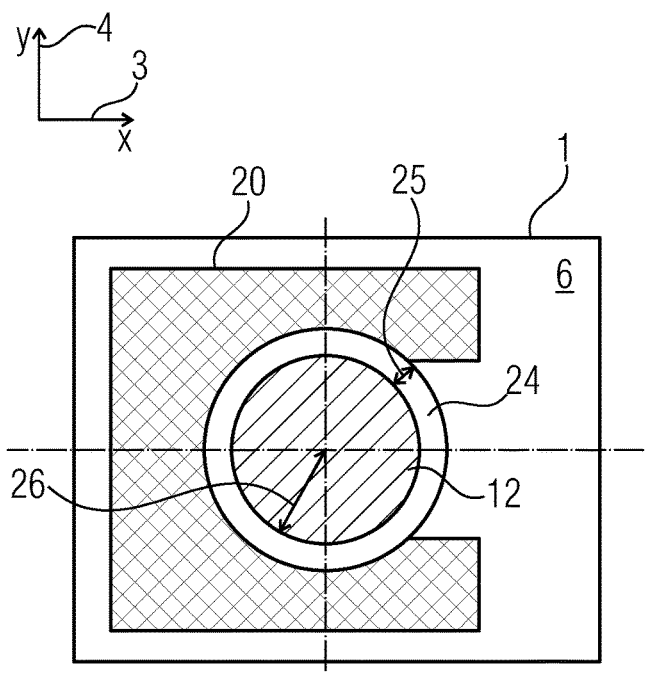
FIG. 7 shows a plan view of the component, the journal, the spacer and the bushing from FIG. 6.
Figure 8:
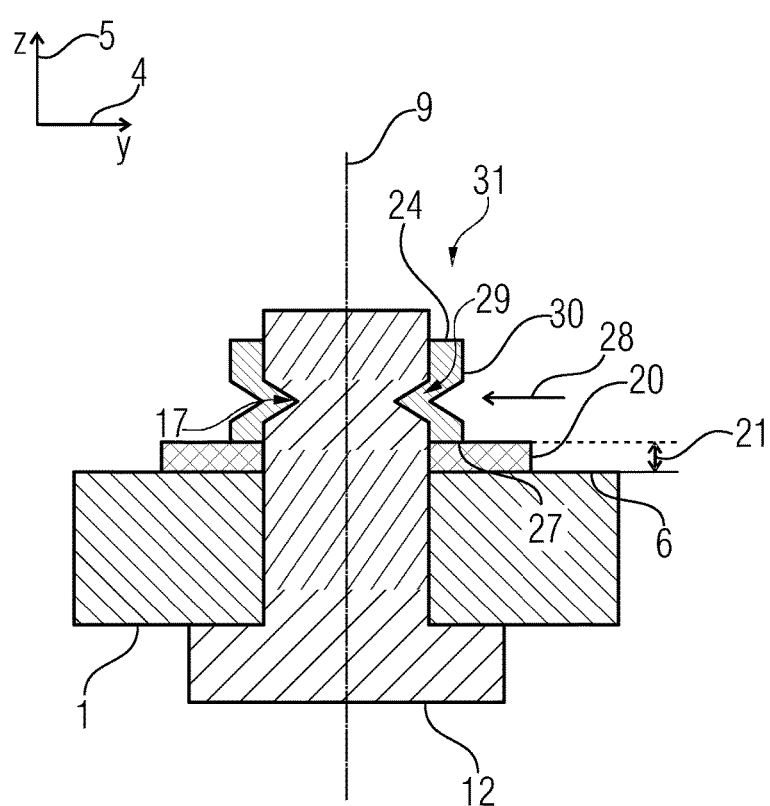
FIG. 8 shows the component, the journal, the spacer and the bushing from FIG. 6, wherein the bushing is deformed in such a way that projections on the bushing engage in complementary recesses in the journal, and wherein the spacer is arranged in such a way between the bushing and the second bearing end that the spacer is in contact with the bushing and with the second bearing end.

FIG. 8 shows the arrangement in FIGS. 6 and 7 after the bushing 24 has been crimped to the journal 12 in a further method step. For this purpose, a force directed radially inward toward the bearing axis 9 in the x-y plane has been exerted on the bushing 24 by means of a crimping tool (not shown here), e.g. by means of crimping tongs, the direction of action of said force being indicated here by arrows 28. In an alternative embodiment, the deformation of the bushing 24 can also be performed by means of a rolling tool. In the method step mentioned, the force in the direction of the arrows 28 acts approximately centrally on a cylindrical outer surface 30 of the bushing 24, with the result that an annular projection 29 extending in the x-y plane is formed, said projection engaging in the annular recess 17 in the surface 18 of the journal 12, more specifically substantially over the entire circumference of the journal 12 in the illustrative embodiment described here. In the direction of action, indicated by the arrows 28, of the force exerted on the bushing 24, the bushing 24 is therefore in each case deformed approximately by 1 mm. In this way, the bushing 24 and the journal 12 engage form-lockingly and force-lockingly in one another in the positive and the negative z directions, with the result that they are fixed relative to one another in the positive and negative z directions.

In the present case, a force indicated by arrows 31 and acting in the negative z direction has been additionally exerted on the bushing 24 during the forming of the projection 29. This ensures that the underside 27 of the bushing 24 is in contact with the spacer 20 even after the formation of the form-locking and force-locking connection between the bushing 24 and the journal 12. Thus, in FIG. 8, the spacer 20 is clamped between the bushing 24 and the upper side 6 of the component 1 in the z direction after the partial deformation of the bushing 24, with the result that the spacing between the underside 27 of the bushing 24 and the upper side 6 of the component 1 in the z direction continues to be defined precisely by the precisely adjustable thickness 21 of the spacer 20, even after the deformation of the bushing 24. In the present example, a deviation in the thickness 21 of the spacer from a nominal thickness beyond the overall lateral extent of the spacer is less than 0.1 mm.

Figure 9:
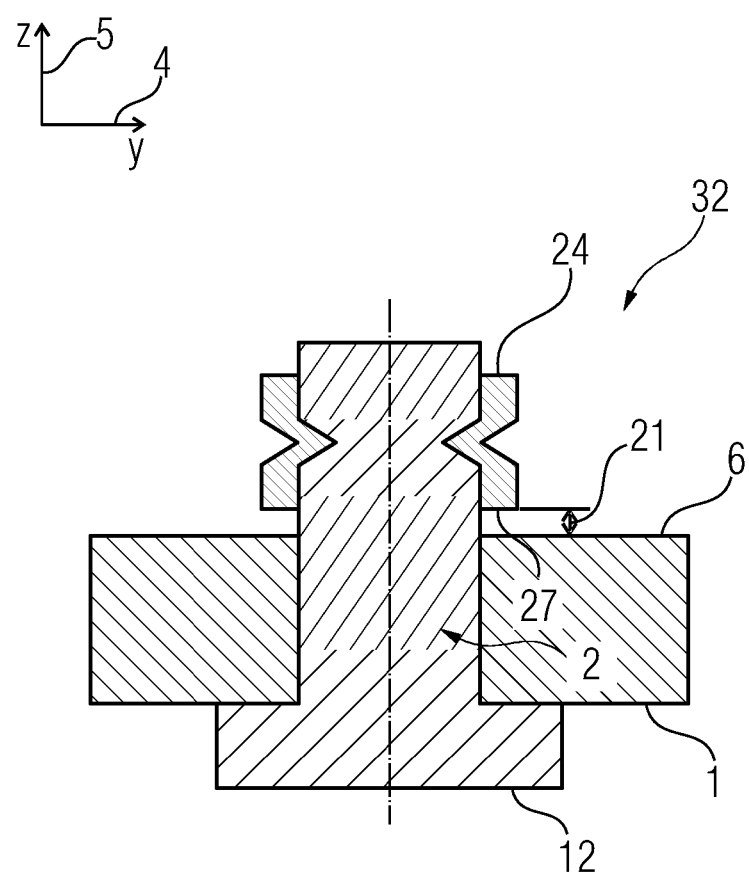
FIG. 9 shows the arrangement shown in FIG. 8 after the spacer has been removed.

FIG. 9 shows the arrangement from FIG. 8 after the spacer 20 has been removed in a further method step. A device 32 according to the invention is provided by this arrangement. The journal 12 is now rotatably mounted and retained in the bearing 2, wherein it can be moved in the z direction relative to the bearing 2 and to the component 1 in the z direction 5 within an axial play defined by the thickness 21 of the spacer 20, which is removed beforehand. The bushing 24 and the journal 12 are connected form-lockingly and force-lockingly to one another as described above. As described above, the form-locking engagement in the positive z direction 5 between the journal 12 and the bearing 2 or between the journal 12 and the component 1 is provided by the widened cross section of the journal 12 at the first bearing end of the bearing 2 on the underside 7 of the component 1. In the positive z direction 5, the journal 12 can thus be moved until the second axial segment 15 strikes against the underside 7 of the component 1, as described above. Further form-locking engagement in the negative z direction between the journal 12 and the bearing 2 or between the journal 12 and the component 1 is achieved by means of the bushing 24 being connected to the journal 12 by deformation. On the underside 27 of the bushing 24, the assembly comprising the bushing 24 and the journal 12 now has a cross section in the x-y plane which is larger than the cross section of the bearing 2 in the x-y plane. In the negative z direction, the journal 12 can now be moved until the underside 27 of the bushing 24 strikes against the upper side 6 of the component 1.

Of course, the journal 12, which is described in a completely schematic way here, can be configured in many different ways. For example, the journal 12 can be a matter of a rotatably mounted shaft or drive shaft of a machine. The journal 12 can likewise be connected form-lockingly and/or force-lockingly and/or materially to other components or machine elements. In an illustrative embodiment not shown explicitly here, the journal 12 is connected to a flap for opening and closing a bypass valve for controlling a boost pressure in a turbocharger for an internal combustion engine or is formed in one piece with said flap, for example. When the journal 12 is rotated in the bearing 2, the bypass valve is opened and closed, wherein the exhaust gas boost pressure of the turbocharger is reduced when the bypass valve is open, with the exhaust gas being routed directly to the exhaust gas outlet.

The invention claimed is:

1. A device comprising:
   a bearing having first and second bearing ends and a bearing axis defining a z direction, a positive z direction pointing from said first bearing end to said second bearing end and a negative z direction being opposite to said positive z direction;

a journal being mounted in said bearing and defining a segment of said journal protruding from said bearing at said second bearing end, said journal being freely movable relative to said bearing along said z direction within an axial play and said journal having a surface; and a bushing at least partially surrounding said segment of said journal and being at least one of form-lockingly or force-lockingly connected to said journal;

said connection between said bushing and said journal being formed by at least one deformation of said bushing engaging in a recess being formed in said surface of said journal and being complementary to said deformation; and said axial play of said journal relative to said bearing in said negative z direction being limited by a form-locking engagement in said negative z direction between said bushing and said second bearing end.

2. The device according to claim 1, wherein said axial play is less than 2 mm.

3. The device according to claim 1, wherein said axial play is less than 1 mm.

4. The device according to claim 1, wherein said journal mounted in said bearing is rotatable relative to said bearing axis.

5. The device according to claim 1, wherein said journal has an end projecting from said bearing at said second bearing end, and said recess in said surface of said journal is spaced apart from said end of said journal in said z direction.

6. The device according to claim 1, wherein said journal is configured to be connected to or formed in one-piece with a flap for opening and closing a bypass valve to control a boost pressure in a turbocharger for an internal combustion engine.

* * * * *